US009175710B2

(12) United States Patent
Schrameyer et al.

(10) Patent No.: US 9,175,710 B2
(45) Date of Patent: Nov. 3, 2015

(54) CONTAINED CERAMIC FASTENER

(71) Applicant: Varian Semiconductor Equipment Associates, Inc., Gloucester, MA (US)

(72) Inventors: Michael A. Schrameyer, Beverly, MA (US); Jeffrey E. Krampert, Topsfield, MA (US)

(73) Assignee: Varian Semiconductor Equipment Associates, Inc, Gloucester, MA (US)

( * ) Notice: Subject to any disclaimer, the term of this patent is extended or adjusted under 35 U.S.C. 154(b) by 52 days.

(21) Appl. No.: 14/134,154

(22) Filed: Dec. 19, 2013

(65) Prior Publication Data
US 2015/0176625 A1 Jun. 25, 2015

(51) Int. Cl.
*F16B 37/00* (2006.01)
*F16B 33/02* (2006.01)
*F16B 37/12* (2006.01)

(52) U.S. Cl.
CPC .............. *F16B 33/02* (2013.01); *F16B 37/00* (2013.01); *F16B 37/12* (2013.01)

(58) Field of Classification Search
CPC ........ F16B 23/00; F16B 23/006; F16B 31/02; F16B 37/00; F16B 37/044; F16B 37/12; F16B 37/14; F16B 37/122; F16B 33/02; G01L 5/24
USPC ............. 411/2, 427, 429, 430, 432, 433, 438, 411/904, 917, DIG. 2
See application file for complete search history.

(56) References Cited

U.S. PATENT DOCUMENTS

| | | | | | |
|---|---|---|---|---|---|
| 2,078,411 | A | * | 4/1937 | Richardson | 411/113 |
| 2,262,450 | A | * | 11/1941 | Camines | 411/282 |
| 2,307,405 | A | * | 1/1943 | Hower | 411/113 |
| 2,363,663 | A | * | 11/1944 | Findley | 411/423 |
| RE24,753 | E | * | 12/1959 | Rohe | 174/138 R |
| 2,967,556 | A | * | 1/1961 | Jaworski | 411/112 |
| 3,943,587 | A | * | 3/1976 | Lasky | 470/18 |
| 5,332,271 | A | | 7/1994 | Grant et al. | |
| 5,454,677 | A | * | 10/1995 | Grant et al. | 411/427 |
| 5,860,779 | A | * | 1/1999 | Toosky et al. | 411/432 |
| 6,033,169 | A | * | 3/2000 | Bettger | 411/433 |
| 6,692,206 | B1 | * | 2/2004 | Clinch et al. | 411/171 |
| 8,061,945 | B2 | * | 11/2011 | Smith | 411/267 |

* cited by examiner

*Primary Examiner* — Roberta Delisle

(57) ABSTRACT

A ceramic fastener includes a ceramic body portion, and a containment layer disposed around the ceramic body portion. The containment layer retains pieces of the ceramic body portion when the ceramic body portion is subjected to a torque sufficient to fracture the ceramic body portion. The fastener can be a nut, and the containment layer can be disposed around one or more of the top, bottom and side surfaces of the nut. The containment layer can be a metal shroud having a thickness from 0.01 to 0.125 inches. The ceramic body portion can be alumina or zirconia. A thread insert may be disposed within a fastener bore of the ceramic body portion.

20 Claims, 5 Drawing Sheets

CONTAINED CERAMIC FASTENER

BACKGROUND OF THE INVENTION

1. Field of the Invention

Embodiments of the invention relate to fasteners in general, and in particular to a contained ceramic fastener.

2. Discussion of Related Art

Ion implantation is a process of depositing chemical species into a substrate by bombardment of the substrate with energized ions. In semiconductor manufacturing, ion implanters are used for doping processes that alter the type and level of conductivity of target materials. A precise doping profile in an integrated circuit (IC) substrate and its thin-film structure is important for proper IC performance. To achieve a desired doping profile, one or more ion species may be implanted in different doses and at different energy levels.

FIG. 1 depicts an ion implanter system 1. The ion implanter 100 includes a power source 101, an ion source 102, extraction electrodes 104, a 90° magnet analyzer 106, a first deceleration (D1) stage 108, a 70° magnet analyzer 110, and a second deceleration (D2) stage 112. The D1 and D2 deceleration stages (often referred to as "deceleration lenses") are each comprised of multiple electrodes with a defined aperture to allow an ion beam to pass therethrough. By applying different combinations of voltage potentials to the multiple electrodes, the D1 and D2 deceleration lenses may manipulate ion energies and cause the ion beam to hit a target workpiece 114 at a desired energy. A number of measurement devices 116 (e.g., a dose control Faraday cup, a traveling Faraday cup, or a setup Faraday cup) may be used to monitor and control the ion beam conditions. Although not shown in FIG. 1, the target workpiece 114 may be supported by a platen which can be used to fix and to move the workpiece during implantation.

It has been discovered that for some silicon wafer workpieces, a relatively low temperature during ion implantation can be advantageous for amorphization of the silicon wafer. For example, performing ion implantation at temperatures below −60° Celsius (C) may substantially improve ion implantation process performance. In ion implantation applications, wafers are typically cooled during the implantation process by a cryogenic liquid supplied to a cooling platen, where the cryogenic liquid has been cooled by a chiller.

In other ion implantations processes, the desired doping profile is achieved by implanting ions in the target substrate at high temperatures (e.g., between 150-600° C.) Heating the target substrate can be achieved by supporting the substrate on a heated platen during the ion implant process.

A platen is typically used to clamp the substrate during implant and provide wafer heating or cooling. As such, the platen and its associated components must be able to withstand large temperature shifts. The fasteners used to fix elements of the platen must, therefore, be able to withstand these large temperature shifts while still maintaining desired fastening forces.

Ceramic fasteners are known for use in high temperature applications. While known ceramic fasteners can withstand desired high temperatures and maintain desired fastening forces, they suffer from the problem that they have the tendency to fail in a catastrophic manner when subject to high installation torques. This failure mode is undesirable because it often results in the uncontrolled dispersal of ceramic pieces and particles in the work area. Thus, there is a need for an improved ceramic fastener design for use in coupling components of semiconductor processing platens.

SUMMARY OF THE INVENTION

This Summary is provided to introduce a selection of concepts in a simplified form that are further described below in the Description of Embodiments. This Summary is not intended to identify key features or essential features of the claimed subject matter, nor is it intended as an aid in determining the scope of the claimed subject matter.

A ceramic fastener is disclosed. The fastener may comprise a ceramic body portion, and a containment layer disposed around at least a portion of the ceramic body portion. The containment layer can be configured to retain pieces of the ceramic body portion when the ceramic body portion is subjected to a torque sufficient to fracture the ceramic body portion.

A contained ceramic nut is further disclosed. The contained ceramic nut may include a ceramic body portion having top and bottom surfaces and a plurality of side surfaces configured for engagement by a driving tool. The contained ceramic nut may further include a containment layer disposed around at least the plurality of side surfaces of the ceramic body portion. The containment layer may be configured to retain pieces of the ceramic body portion when the ceramic body portion is subjected to a torque sufficient to fracture the ceramic body portion.

A ceramic nut is additionally disclosed. The ceramic nut may include a ceramic body portion having top and bottom surfaces and a plurality of side surfaces configured for engagement by a driving tool. The ceramic nut may further include a metal shroud disposed around at least a portion of the ceramic body portion. The metal shroud can be configured to retain pieces of the ceramic body portion when the ceramic body portion is subjected to a torque sufficient to fracture the ceramic body portion.

BRIEF DESCRIPTION OF THE DRAWINGS

The accompanying drawings illustrate preferred embodiments of the disclosed method so far devised for the practical application of the principles thereof, and in which.

DESCRIPTION OF EMBODIMENTS

High temperature and low temperature implants are becoming increasingly popular. To enable platens to achieve these implant temperatures they need to be thermally isolated from room temperature components, yet need to be secured to such devices. In order to accomplish this, thermally insulating ceramic fasteners could be used. However, such ceramics cannot typically handle high preload and operating forces without shattering. Accordingly, a ceramic fastener having a containment layer as provided herein enables the fastener to continue to function and be removed as one piece even if the ceramic cracks.

The disclosed fastener will now be described more fully hereinafter with reference to the accompanying drawings, in which embodiments of the disclosure are shown. The disclosed fastener, however, may be embodied in many different forms and should not be construed as limited to the explicitly recited embodiments set forth herein.

Figure 1:
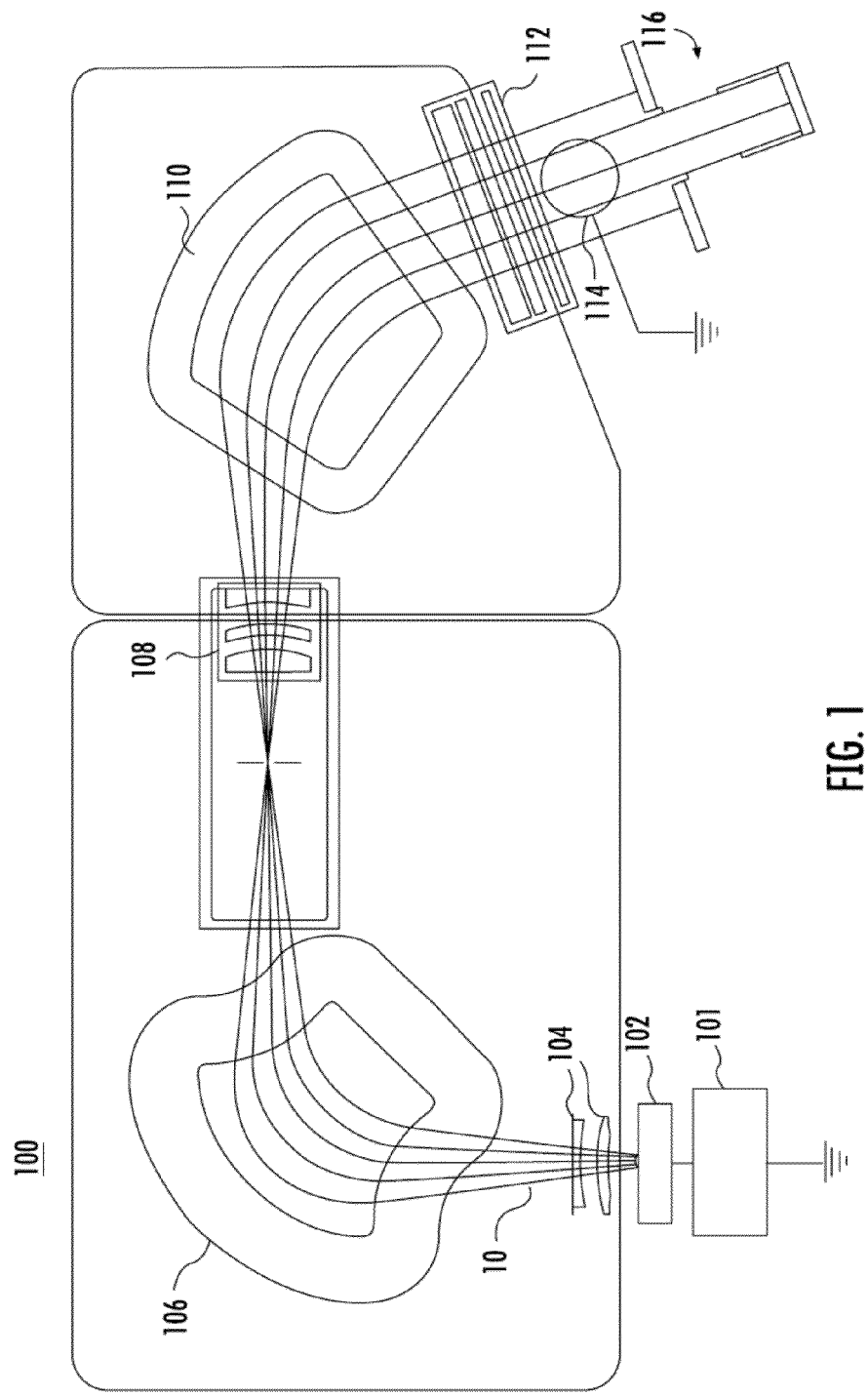
FIG. 1 is a schematic illustration of an exemplary ion implant system.
Figure 2:
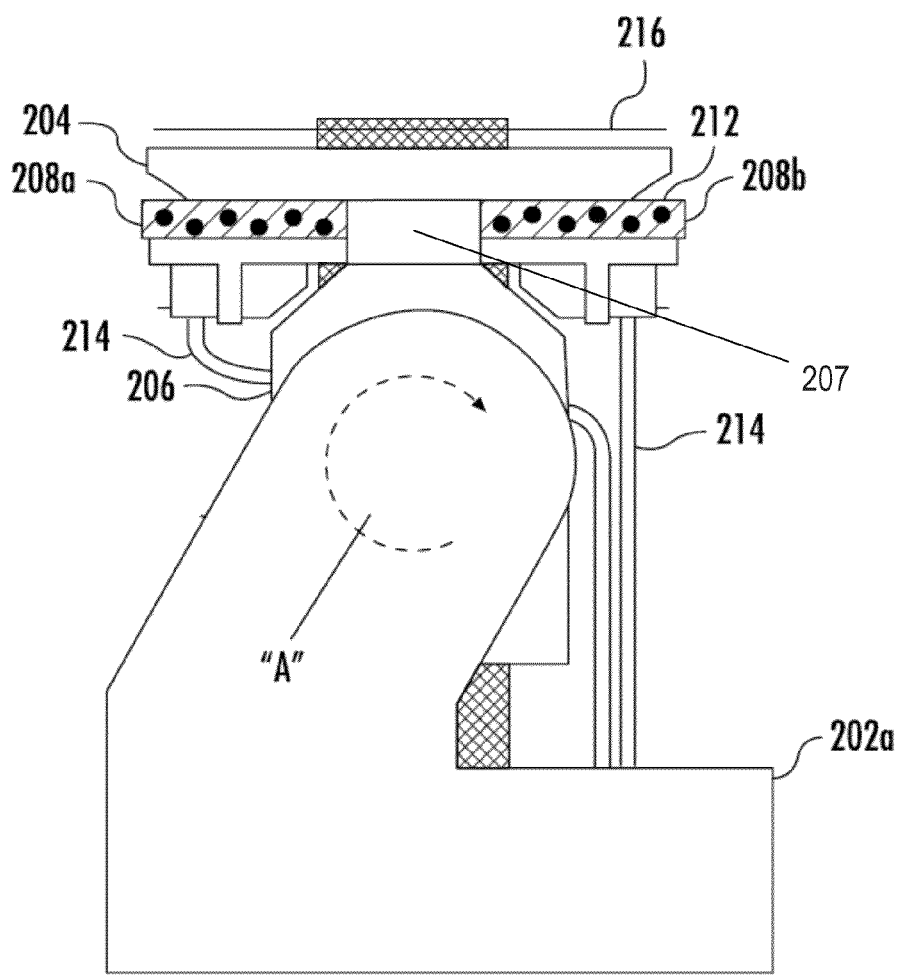
FIG. 2 is a side view of an exemplary platen system for use with the ion implant system of FIG. 1.

Referring to FIG. 2, an exemplary rotating platen apparatus 200 is shown. The rotating platen apparatus 200 includes a base 202a, a platen 204, and a motor 206 connected to the platen 204. In this example, one or more thermal pads 208a, 208b are provided beneath the platen 204. The thermal pads 208a, 208b may include thermal channels 212 through which cryogenic fluid can flow within the thermal pads 208a, 208b. As cryogenic fluid flows through the thermal pads 208a, 208b, a wafer 216 disposed on the platen 204 may be cooled to a desired temperature. In one non-limiting exemplary embodiment, the temperature may be from about −60 to about −100° C. The thermal channels 212 in the thermal pads 208a, 208b may connect to one or more supply and drain pipes 214, which, in turn, are connected to a cryogenic fluid source and/or drain (not shown).

The thermal pads 208a, 208b may also include one or more heating elements (not shown) to heat the platen 204 to a desired temperature or within a desired temperature range. In some embodiments the heating elements may comprise an electrically conductive material. During operation, to heat the platen 204 the heating elements may be activated, to heat the platen 204 to a temperature of between 150 and 600° C.

It will be appreciated that although thermal pads 208a, 208b may be used, it is also contemplated that thermal pads are not required. In addition, although the heating and cooling functionality is shown as being incorporated into the thermal pads 208a, 208b, it will be appreciated that the heating and cooling functionality can be incorporated into two or more separate layers or regions beneath the platen 204. Further, in some embodiments the thermal channels and/or the heating elements may be integrated directly into the platen 204.

Figure 3:
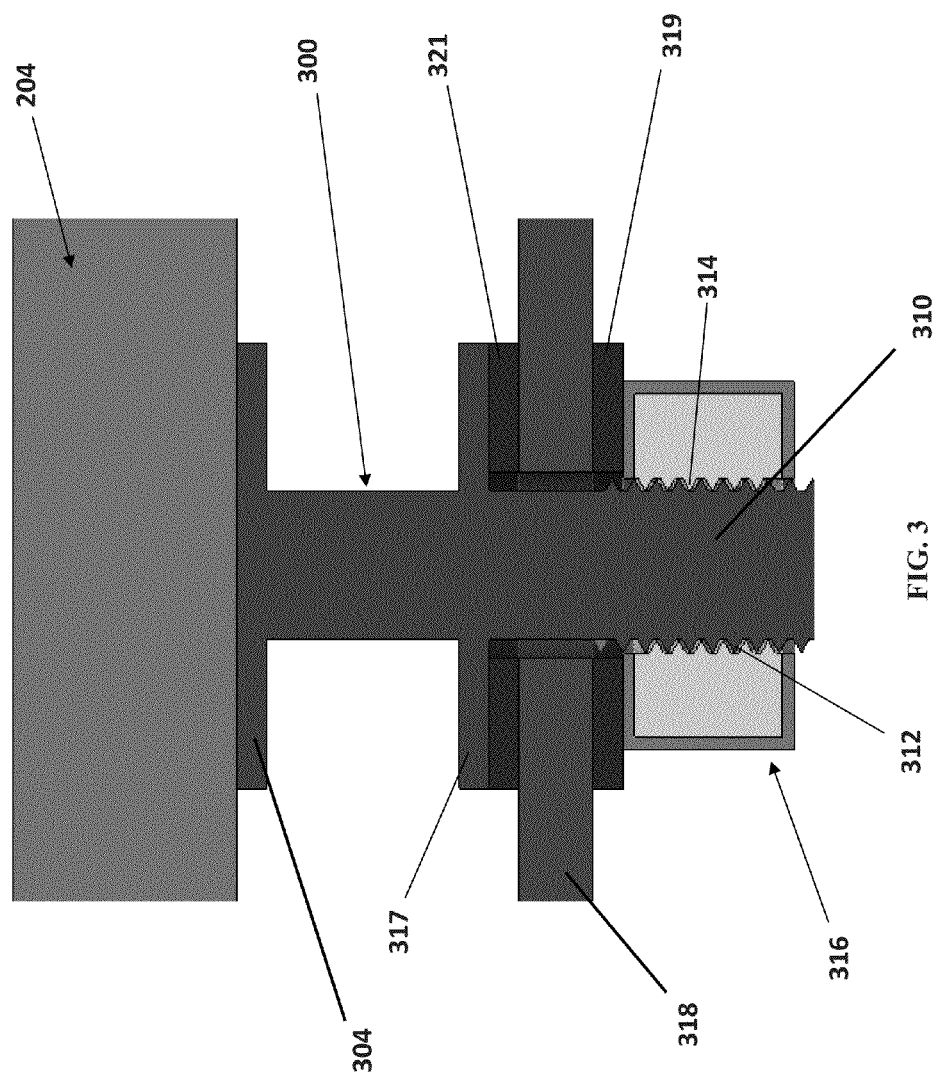
FIG. 3 is a cross-section view of a portion of the exemplary platen system of FIG. 2.

FIG. 3 shows an exemplary portion of the rotating platen apparatus 200 (FIG. 2) illustrating an arrangement for coupling the platen 204 to the remainder of the rotating platen apparatus. As can be seen, a mounting stud 300 has a first end 304 coupled to the platen 204. The mounting stud 300 may reside generally within in region 207 (FIG. 2), directly beneath the platen 204 of the platen apparatus 200. In this embodiment the platen 204 is shown including the heating elements, which can include one or more resistive heating elements on a bottom or middle portion, and an electrostatic clamp on the top. The mounting stud 300 may be coupled to the platen 204 using complementary threads, adhesive, brazing or the like. The second end 310 of the mounting stud 300 includes external threads 312 for engaging complementary inner threads 314 of the disclosed ceramic fastener 316. A thermal flexure 318 is disposed between the ceramic fastener 316 and a flange portion 317 of the mounting stud 300. The thermal flexure 318 may accommodate thermal expansion differences between the associated connected elements as the platen is heated and/or cooled to the previously noted temperature ranges. The thermal flexure 318 may also act as a thermal conduction resistance element for the mounting stud 300. The thermal flexure 318 may allow assembly of the device at room temperature, while enabling the arrangement to remain tightly coupled during the later heating and/or cooling cycles.

In one non-limiting exemplary embodiment, the thermal flexure may be comprise a bellows arrangement, though other structures capable of providing the desired thermal accommodation may also be used. In some embodiments, a first annular spacer 319 can be disposed between the thermal flexure 318 and the ceramic fastener 316, and a second annular spacer 321 can be disposed between the thermal flexure and the flange portion 317. In some embodiments the first and second annular spacers can be washers.

Figures 4A, 4B:
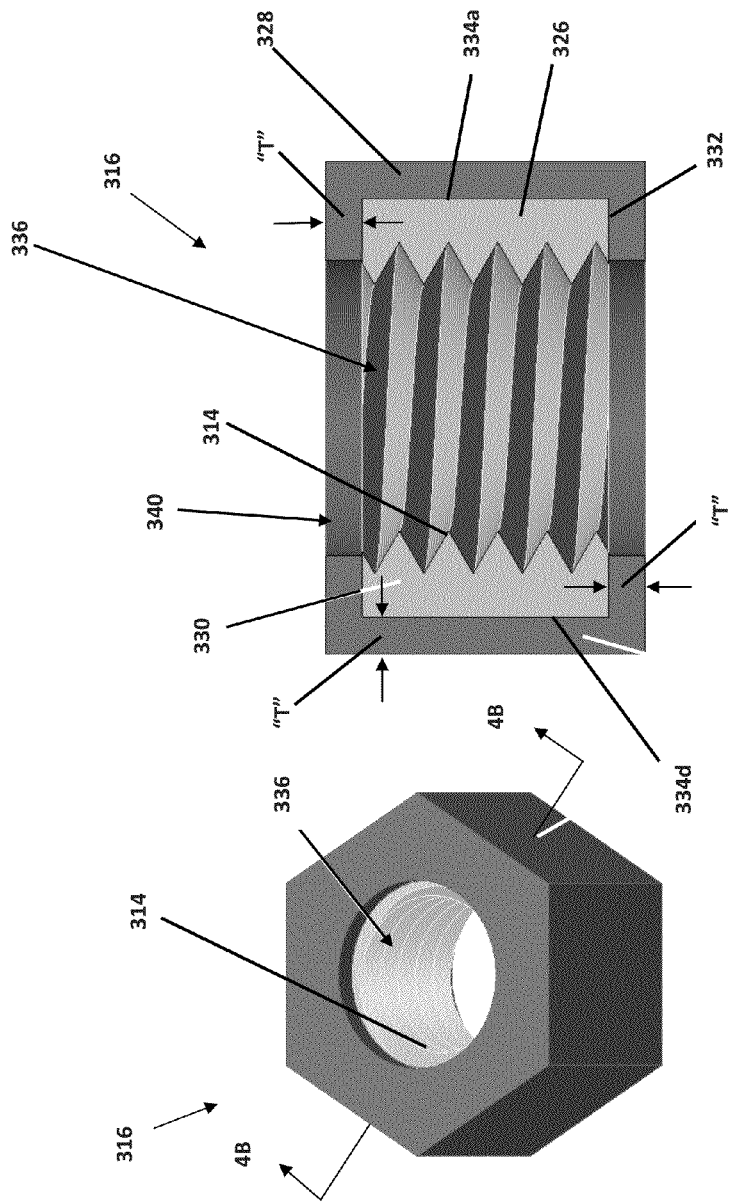
FIG. 4A is an isometric view of an exemplary ceramic nut for use in the platen system of FIGS. 2 and 3.
FIG. 4B is a cross-section view of the exemplary ceramic nut of FIG. 4A, taken along line 4B-4B of FIG. 4A.

Referring now to FIGS. 4A and 4B, the ceramic fastener includes a ceramic body portion 326 and a containment layer 328 disposed about at least part of the ceramic body portion. In the illustrated embodiment, the ceramic body portion 326 comprises a nut having a top surface 330, a bottom surface 332 a plurality of side surfaces 334a-n and a threaded bore 336. As will be appreciated, the plurality of side surfaces 334a-n may be oriented with respect to each other so that they can be engaged by a driving tool, such as a torque wrench. In the illustrated embodiment the plurality of side surfaces 334a-n are configured in a hexagonal arrangement. It will be appreciated, however, that other surface configurations can be used, a non-limiting exemplary listing of which includes any of a variety of polygonal shapes. The ceramic body portion 326 may be formed from any of a variety of appropriate ceramic materials, a non-limiting exemplary listing of which includes alumina and zirconia.

The containment layer 328 may partially or fully enclose some or all of the top, bottom and side surfaces 330, 332, 323a-n so as to contain the pieces of the ceramic body portion should the ceramic body portion 326 fail during installation or use. In some embodiments, the containment layer 328 need not enclose all of the top, bottom and side surfaces 330, 332, 334a-n. Rather, the containment layer 328 may be configured to enclose only a portion of each surface. Alternatively, the containment layer 328 may be configured to enclose the top surface 330 and side surfaces 323a-n, but not the bottom surface 332.

The containment layer 328 may be a preformed "shell" into which the fastener is press-fit. The "shell" may then be bent down onto one or more of the top and bottom surfaces 330, 332 to cover those surfaces. Alternatively, the "shell" may be formed in two pieces that can be coupled around the ceramic body portion 326 and the edges may be brazed together.

Although the opening 340 in the containment layer 328 is shown as being the same size as the threaded bore 336 of the ceramic body portion 326, the opening in the shroud may be configured to be larger than the bore of the ceramic body portion.

The containment layer 328 may comprise a thin metal shroud having a thickness "T" of from about 0.01-inches to about 0.125-inches. In one embodiment the metal shroud may be made from stainless steel. It will be appreciated that other materials and/or thicknesses can also be used, as long as they can function to effectively retain broken pieces of the ceramic body portion 326 when the ceramic body portion is subjected to a torque sufficient to fracture the ceramic body portion. Although the containment layer 328 is shown having the same thickness "T" along the top, bottom and side surfaces 330, 332, 334a-n of the ceramic body portion 326, it will be appreciated that the containment layer can be provided in different thicknesses "T" adjacent to different surfaces of the ceramic body portion.

Figure 5:
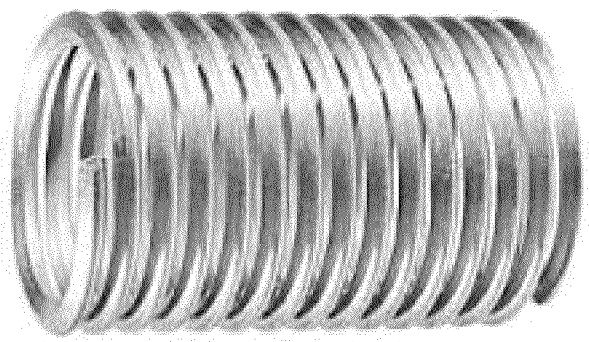
FIG. 5 is an exemplary thread insert for use with the exemplary ceramic nut of FIGS. 4A and 4B.

In the illustrated embodiment the ceramic body portion 326 includes inner threads 314 for engaging the threads 312 of the mounting stud 300. In some embodiments it may be desirable to provide the ceramic body portion 326 with a thread insert 338 (FIG. 5) engaged with the inner threads 314. In one non-limiting exemplary embodiment, the thread insert 338 is a metal helicoil. The thread insert 338 may protect the inner threads 314 and help to spread out the torque and pre-load force, thereby increasing the torque that the ceramic body portion 326 can accommodate before failing. In some embodiments, using the thread insert 338 may increase the amount of torque the ceramic fastener 316 can withstand to values commensurate with similarly-sized traditional stainless steel fasteners.

With the disclosed arrangement, the containment layer 328 encasing the ceramic body portion 326 can contain the ceramic material and prevent the ceramic body portion from failing catastrophically. It can also allow the ceramic material to function as a fastener even after it has cracked and/or shattered.

Where the ceramic fastener 316 is used in cold applications the containment layer 328 (if made from metal) will shrink faster than the ceramic body portion 326, which can impart compressive stress on the ceramic body portion. Ceramic, however, is excellent at handling compressive stress, so such thermal mismatch is not expected to be detrimental to the ceramic body portion 326.

Where the ceramic fastener 316 is used in hot application, the containment layer 328 (if made from metal) will expand faster than the ceramic body portion, creating a small gap therebetween. If the ceramic nut is shaped with a hex outer surface for use with a wrench, the metal containment layer 328 will expand with the same shape. Although the metal containment layer 328 may loosen at high temperatures, it is not expected to slip off the ceramic body portion 326, or rotate independently of the ceramic body portion 326 because the gap is expected to be small compared to the hexagonal length.

As will be understood, metal fasteners are desirable because they are ductile and can deform to handle high preloads. However, metals in general are poor thermal and electrical insulators. Ceramics are good thermal and electrical insulators but cannot handle high preloads without shattering. By containing a ceramic body portion 326 in a metal containment layer 328 the thermal and electrical insulating properties of the fastener are maintained and the fastener will not fail catastrophically even if subjected to high preloads. If the fastener is over torqued above the level which the ceramic can withstand, the ceramic may crack. However, the threaded shaft of the mounting stud 300 and the containment layer 328 will retain the ceramic body portion 326 in place and allow it to continue to function and to be removed as one piece. This prevents pieces of broken ceramic from becoming uncontrolled debris.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. While the invention has been disclosed with reference to certain embodiments, numerous modifications, alterations and changes to the described embodiments are possible without departing from the spirit and scope of the invention, as defined in the appended claims. Accordingly, it is intended that the present invention not be limited to the described embodiments, but that it has the full scope defined by the language of the following claims, and equivalents thereof.

What is claimed is:

1. A ceramic fastener, comprising:
   a ceramic body portion; and
   a containment layer disposed around at least a portion of the ceramic body portion, the containment layer having an opening at top and bottom surfaces of the ceramic body portion, the opening at the top and bottom surfaces being at least as large as a corresponding bore of the ceramic body portion;
   wherein the containment layer is configured to retain pieces of the ceramic body portion when the ceramic body portion is subjected to a torque sufficient to fracture the ceramic body portion.

2. The ceramic fastener of claim 1, wherein the ceramic body portion comprises a nut having top and bottom surfaces and a plurality of side surfaces configured for engagement by a driving tool, the containment layer disposed around the plurality of side surfaces.

3. The ceramic fastener of claim 2, wherein the containment layer is further disposed around the top surface.

4. The ceramic fastener of claim 1, wherein the containment layer comprises a metal shroud.

5. The ceramic fastener of claim 1, wherein the containment layer has a thickness of from 0.01 inches to 0.125 inches.

6. The ceramic fastener of claim 1, wherein the ceramic body portion comprises alumina or zirconia.

7. The ceramic fastener of claim 6, wherein the ceramic body portion comprises a nut having top and bottom surfaces and a plurality of side surfaces configured for engagement by a driving tool, the containment layer disposed around the plurality of side surfaces.

8. The ceramic fastener of claim 1, further comprising a thread insert disposed within the bore of the ceramic body portion.

9. A ceramic nut, comprising:
   a ceramic body portion having top and bottom surfaces and a plurality of side surfaces configured for engagement by a driving tool; and
   a containment layer disposed around at least the plurality of side surfaces of the ceramic body portion, the containment layer having an opening at top and bottom surfaces of the ceramic body portion, the opening at the top and bottom surfaces being at least as large as a corresponding bore of the ceramic body portion;
   wherein the containment layer is configured to retain pieces of the ceramic body portion when the ceramic body portion is subjected to a torque sufficient to fracture the ceramic body portion.

10. The ceramic nut of claim 9, wherein the containment layer is further disposed around the top surface.

11. The ceramic nut of claim 10, wherein the containment layer is further disposed around the bottom surface.

12. The ceramic nut of claim 9, wherein the containment layer comprises a metal shroud.

13. The ceramic nut of claim 9, wherein the containment layer has a thickness of from 0.01 inches to 0.125 inches.

14. The ceramic nut of claim 9, wherein the ceramic body portion comprises alumina or zirconia.

15. The ceramic nut of claim 9, further comprising a thread insert disposed within the bore of the ceramic body portion.

16. A ceramic nut, comprising:
   a ceramic body portion having top and bottom surfaces and a plurality of side surfaces configured for engagement by a driving tool; and
   a metal shroud disposed around the top surface, the bottom surface and the plurality of sides surfaces of the ceramic body portion, the metal shroud having an opening at the top and bottom surfaces of the ceramic body portion, the opening in the top and bottom surfaces being at least as large as a corresponding bore of the ceramic body portion;
   wherein the metal shroud is configured to retain pieces of the ceramic body portion when the ceramic body portion is subjected to a torque sufficient to fracture the ceramic body portion.

17. The ceramic nut of claim 16, wherein the ceramic body portion comprises zirconia or alumina.

18. The ceramic nut of claim 16, wherein the metal shroud comprises stainless steel.

19. The ceramic nut of claim 16, wherein the metal shroud has a thickness of from 0.01 inches to 0.125 inches.

20. The ceramic nut of claim 16, further comprising a thread insert disposed within the bore of the ceramic nut.

* * * * *